United States Patent Office 3,591,686
Patented July 6, 1971

3,591,686
ANTI-INFLAMMATORY COMPOSITIONS AND METHODS UTILIZING N-ACYLCYSTEINES AND THE β-ALKYL AND CARBOXYL DERIVATIVES THEREOF
Aaron Leonard Sheffner, Evansville, Ind., assignor to Mead Johnson & Company, Evansville, Ind.
No Drawing. Continuation-in-part of application Ser. No. 482,931, Aug. 26, 1965. This application Aug. 1, 1967, Ser. No. 657,498
Int. Cl. A61u 27/00
U.S. Cl. 424—234                                       21 Claims

ABSTRACT OF THE DISCLOSURE

N-acylcysteines and the β-alkyl and carboxyl derivatives thereof have anti-inflammatory action in animals.

This application is a continuation-in-part of copending application Ser. No. 482,931 filed Aug. 26, 1965, now abandoned.

This invention involves a novel method for ameliorating inflammatory conditions in mammals such as dermatitis, sprains, strains, inflammation associated with infections, and diseases of the gastric mucosa, joints, and connective tissue. It involves the systemic administration of an α-(N-acylamino)-β-mercaptoalkanoic acid compound such as the acid itself or a non-toxic salt thereof. By systemic administration is meant administration so as to achieve circulation of the drug in the blood stream. This may be accomplished by ingestion resulting in absorption of the drug from the alimentary tract, by injection either intravenously, subcutaneously, intramuscularly, intraperitoneally, or intra-articularly or by rectal administration for instance by means of insertion of a suppository or jelly.

The α-(N-acylamino)-β-mercaptoalkanoic acids have from 3 to 11 carbon atoms apart from the N-acyl group thereof. The N-acyl group may be aroyl of up to 8 carbon atoms, alkanoyl, or alkanedioyl, each having up to 6 carbon atoms. All optical forms of the α-(N-acylamino)-β-mercaptoalkanoic acid compounds are operative, and the use of each is contemplated by the present invention.

To achieve the desired anti-inflammatory effect, the α-(N-acylamino))-β-mercaptoalkanoic acid compounds are administered in non-toxic doses of at least about 20 mg./kg. of body weight of the host per day. Multiple daily doses extending over several days or more are frequently required. These substances are very well tolerated and have exceedingly low toxicities, and for this reason they offer advantages over prior treatment methods where side effects have severely limited the use of the active ingredients involved. Doses of up to 400 mg./kg. may be employed.

The α-(N-acylamino)-β-mercaptoalkanoic acids, carboxamides, and esters employed in the present invention have the following formula:

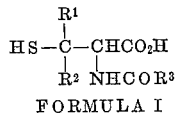

FORMULA I

In Formula I, $R^1$ and $R^2$ are hydrogen or lower alkyl groups having up to 4 carbon atoms. $R^3$ is hydrogen, aryl of up to 7 carbon atoms, lower alkyl or carboxy lower alkyl of up to 5 carbon atoms. Suitable N-acylamino groups ($R^3CONH-$) include formylamino, acetylamino, propionylamino, benzoylamino, capropylamino, butyrylamino, succinylamino, etc.

Representative α-(N-acylamino)-β-mercaptoalkanoic acid compounds useful in this process include N-acetyl-L-cyteine, N-acetyl-D-cysteine, N-succinyl-DL-cysteine, N-propionyl-L-cysteine, N-benzoyl-L-cysteine, N-acetyl-DL-penicillamine, N-acetyl-β-mercapto - DL - isoleucine, N-formyl-D-cysteine, N-formyl - D - penicillamine, N-caproylcysteine.

The acid of Formula I may be partially or completely neutralized by pH adjustment of solutions thereof when formulated into liquid preparations for ingestion or injection. Adjustment of pH is effected by suitable alkaline reacting non-toxic substances such as sodium hydroxide, ammonium hydroxide, non-toxic organic bases, or the like, and thus the non-toxic salts of these sulfhydryl compounds such as the salts of sodium, ammonium, calcium, magnesium, ethanolamine and the like, are included within the scope of this invention.

Processes for preparing the active ingredients employed in this invention are known to those skilled in the art. A number of the mercaptoalkanoic acids of Formula I have been described in U.S. Pat. 3,091,569 of the same Aaron Leonard Sheffner named as inventor herein.

U.S. 3,091,569 deals with an invention which involves the liquefaction of mucus by contact with an N-acylated sulfhydryl amino acid of the type shown in Formula I. Processes of administration described in that patent involve direct contact of the compound with the mucus such as by inhalation of solutions of the sulfhydryl compounds or insufflation of powders into the respiratory passages, instillation of solutions thereof into the nose, or by direct mixing as may be the case with respect to laboratory use or other topical uses. The present invention is distinguished from U.S. 3,091,569 in that systemic administration is employed and different pharmacologic effects are obtained. The unexpected observation has been made that an anti-inflammatory effect results on systemic administration of the α-(N-acylamino)-β-mercaptoalkanoic acids or their salts. Local application to the inflamed tissue is sometimes possible.

A further aspect of the present invention involves the discovery that the present α-(N-acylamino)-β-mercaptoalkanoic acid compounds have a potentiating action on the anti-inflammatory effect achieved by the administration of the salicylate analgesics. The latter term applies to a well recognized class of derivatives of salicylic acid including aspirin, sodium acetylsalicylic acid, salicylamide, and sodium or potassium salicylate. Standard reference texts such as "Textbook of Organic Medicinal and Pharmaceutical Chemistry," edited by Wilson, Gisvald and Doerge, J. B. Lippincott Company, Fifth Edition 1966, pp. 673–680, give other examples. As a result of this invention novel compositions are provided involving an α-(N-acylamino)-β-mercaptoalkanoic acid compound as defined above and a salicylate analgesic as active ingredients. These compositions are formulated into dosage compositions such that a daily unit thereof provides from about 0.15 to about 8 g. per day of salicylate and from about 0.5 to about 10.0 g. per day of a specified α-(N-acylamino)-β-mercaptoalkanoic acid compound. One recommended form supplies about 250 mg. of N-acetylcysteine and about 325 mg. of aspirin in conjunction with suitable excipients and carriers in each dosage unit such as a tablet or solution for injection. Suppositories containing these ingredients are also useful.

Among the advantages afforded by the anti-inflammatory process involving administration of α-(N-acylamino)-β-mercaptoalkanoic acid compounds is the improved gastric toleration thereof and decreased propensity to bring about the excretion of trace minerals such as copper, presumably as a result of chelate formation in the blood or other body fluids. These properties and the anti-inflammatory action thereof are illustrated by the animal experiments described below.

The so-called anaphylactic joint test (French, et al., Proceedings of the Society for Experimental Biology and Medicine 89, 41 (1955)) is one manner of illustrating the present anti-inflammatory process. According to this method, normal guinea pigs of either sex weighing 350–450 g. are used. The day prior to use test animals are selected, grouped, and the hair clipped from the hind legs. On the day of test the animals receive an intraperitoneal injection of the test compound. Control animals receive an injection of the vehicle only. The test compounds are administered 30 min. prior to challenge with anti-guinea pig serum produced in rabbits and titered by a double ring precipitant test procedure and stored at −18° C. until used. This anti-serum produces a consistent and measurable swelling (inflammation and edema) when injected intra-articularly into the hind leg ankle joint. One ankle joint is injected with 0.1 ml. of undiluted anti-serum and the other receives the same volume of saline. Exact measurement of joint size is made plethysmographically 2 hours following joint injection. The swelling produced by these injections of anti-serum is expressed as percent increase in volume relative to the saline control ankle of each animal. The results for each compound are then expressed as percent protection which is calculated from the formula $[1-(T/C)] \times 100 =$ percent protection in which C is the increase in volume observed in the control group and T is the increase in volume observed in the medicated group. Results for the various compounds employed in this test are given in the following table.

TABLE I.—ANAPHYLACTIC JOINT TEST

| Compound | Total dose (mg./kg.) | Percent protection |
| --- | --- | --- |
| N-acetyl-L-cysteine | 200 | 56 |
| Do | [1] 400 | 75 |
| N-acetyl-DL-penicillamine | [1] 400 | 70 |
| N-acetyl-D-penicillamine | 200 | 55 |
| N-succinyl-L-cysteine | [1] 400 | 74 |
| N-acetyl-DL-cysteine | 200 | 82 |
| N-benzoyl-L-cysteine | [2] 240 | 70 |
| Phenylbutazone | 200 | 45 |

[1] Divided into 100 mg. units administered 30 min. prior to and 30, 60, and 90 min. after insult.
[2] Divided into 80 mg. units administered during 24 hr. prior to insult; the last 30 min. prior to insult.

The passive sensitization method of Herxheimer, J. Physiol. 117, 251 (1952) may also be used to measure the anti-inflammatory action of the present compounds. According to this test guinea pigs are passively sensitized by injection with anti-crystalline egg albumin rabbit serum 24 hours prior to treatment with the test compound. Sixty minutes after treatment with the test compound the animals are exposed to an aerosolized 2% solution of crystalline egg albumin and the time required for a hard cough with severe dyspnea to develop is recorded. Groups of seven animals are used. A control group of sensitized animals is treated with the vehicle only and the percent protection is calculated from the formula $$[1=(C/T)] \times 100$$

in which C is the mean pre-cough time of the control group and T is the mean pre-cough time of the treated group. Results for several compounds are given in the following table:

TABLE II.—PASSIVE SENSITIZATION TEST

| Compound | Total dose (mg./kg.) | Percent protection |
| --- | --- | --- |
| N-acetyl-L-cysteine | 200 | 69 |
| N-acetyl-DL-penicillamine | [1] 400 | 54 |
| N-propionyl-L-cysteine | 200 | 61 |

[1] Divided into two doses administered 60 to 30 min. prior to challenge.

The process of the present invention may be demonstrated by another animal test involving male rabbits of the New Zealand strain weighing between 1.4 and 2.6 kg. The animals are kept in separate cages and supplied food and water ad libitum for one week prior to the experiment. Twenty-four hours prior to commencing an experiment the hair is surgically clipped, but no depilatory agent is used. The test compounds are dissolved in pyrogen-free distilled water, the solution adjusted to pH 7.2±0.1 with sodium hydroxide, and the sodium ion concentration then adjusted to 0.154 molar by the addition of sodium chloride. Test compounds are administered either by intravenous injection into an ear vein, by subcutaneous injection into the hind leg, or orally by stomach tube. Treatments are administered twice daily until the experimental regimen has been completed. In some cases single doses have been used. The final test treatment is completed 1 hr. before injection of the standardized inflammatory agent. The inflammatory agent employed is dog serum or bovine serum fraction V (Pentex, Inc.) which had been lyophylized and stored at −20° C. Prior to use, these agents are dissolved in saline and standardized to produce an inflammed area 20–22 mm. in diameter when 0.2 ml. thereof is injected. The inflammatory agent is injected intradermally at each of four sites along one side of the back or abdomen, while equivalent volumes of saline are injected at corresponding sites along the other side of the midline to serve as control sites. A dye, either rose bengal or Evans blue (both of Allied Chemical Corporation), is dissolved in saline and injected to assist in locating the inflamed areas. These dyes, when injected intravenously, enter the inflamed sites and make them readily distinguishable. Inflammation is quantitated by measuring the increased serous fluid accumulation at the inflamed site according to the method of Ungar, et al. (Archives Intl. Pharmacodynamics 123, 71 (1959). Animals were sacrificed approximately 3 hrs. after injection of the inflammatory agent, their skins removed and stapled hairside down on a board. The inflamed and saline injected areas were excised with a metal punch, and weighed in a Roller-Smith balance to the nearest milligram. Fluid accumulation was determined by comparing the weight of an inflamed area of skin with that of a corresponding saline injected area. In some experiments, inflammation was quantitated by measuring the increased accumulation of intravenously injected radioactive rose bengal-$I^{131}$. Reduction in inflammation was calculated by comparing inflammations in animals receiving test compound with that of animals receiving saline. Statistical significance was determined by the "$t$" test or "$f$" test.

In one experiment, the effect of multiple doses of acetylcysteine and acetylpenicillamine was studied. Six groups of 2 animals each were given varying numbers of injections with the test compound prior to challenge with the inflammatory agent. One, three, or five injections were employed. A uniform dose level corresponding to 1.5 millimoles per kg. of body weight was used in each instance. After five injections of acetylcysteine, a statistically significant reduction of inflammation in the test animals was observed. A statistically significant reduction in the inflammation occurred after three injections of acetylpenicillamine which was not increased in magnitude when five injections were employed. The results are shown in the following table. Methionine, injected in the same fashion, gave no reduction in inflammation.

TABLE III.—DERMAL INFLAMMATION IN RABBITS; MULTIPLE SUBCUTANEOUS INJECTIONS

| Compound | Dose (mg./kg.) | No. of injections | Reduction in inflammation, percent | P [1] |
|---|---|---|---|---|
| N-acetylcysteine | 244 | 1 | 4 | NS |
| Do | 244 | 3 | 10 | NS |
| Do | 244 | 5 | 23 | 0.01 |
| N-acetylpenicillamine | 286 | 1 | 0 | NS |
| Do | 286 | 3 | 29 | 0.01 |
| Do | 286 | 5 | 30 | 0.01 |
| MethionineMethionine | 224 | 1 | 9 | NS |
| Do | 224 | 3 | 4 | NS |
| Do | 224 | 5 | 0 | NS |

[1] Statistical significance; probability of error; NS means "not significant."

When the preceding experiment was repeated for N-acetylcysteine by oral administration and employing 4 animals per group, it was found that a significant reduction in inflammation (34%) occurred after eight doses each of 163 mg./kg. (1.0 millimole). Similarly with N-acetylpenicillamine a statistically significant reduction in inflammation was observed with two consecutive doses each of 151 mg./kg. (0.79 millimole) or 300 mg./kg. (1.57 millimole). Reductions in inflammation were respectively 42% and 54%.

In an additional experiment the anti-inflammatory effects of N-acetylcysteine and aspirin when administered alone and in combination were studied by dermal inflammation in rabbits according to the method described above. N-acetylcysteine administered orally in two doses of 326 mg./kg. (2.0 millimoles) 17 hr. and 1 hr. prior to challenge failed to give a statistically significant reduction in inflammation. A single subcutaneous dose of 270 mg./kg. (1.5 millimole) aspirin 1 hr. prior to challenge effected a 20% reduction in inflammation. The same doses of these two substances when administered concomitantly to the same animal, effected a 37% reduction in inflammation. The increase in activity observed was statistically significant. These results are given in the following table.

TABLE IV.—DERMAL INFLAMMATION IN RABBITS; CONCOMITANT TREATMENT WITH ASPIRIN AND ACETYLCYSTEINE

| Treatment | No. of doses | Reduction in inflammation, percent | P [1] |
|---|---|---|---|
| N-acetylcysteine, 326 mg./kg. per os | 2 | 6 | NS |
| Aspirin, 270 mg./kg., subcutaneous | 1 | 20 | 0.05 |
| N-acetylcysteine (326 mg./kg. per os) and aspirin (270 mg./kg., subcutaneous) | 2 1 | 37 | 0.01 |

[1] Statistical significance; probability of error; NS means "not significant."

To illustrate the greater acceptability on ingestion of N-acetyl-L-cysteine and N-acetyl-DL-penicillamine over the closely related sulfhydryl compounds L-cysteine and DL-penicillamine, an experiment involving the oral administration of these compounds to normal dogs is described. Normal dogs were fasted for approximately 18 hrs. and then treated orally with 1.65 millimoles of test compound per kg. of body weight. The animals were then observed for the incidence of vomiting which was recorded. In those instances where vomiting was observed, it occurred within ½ hr. of treatment and usually within a few minutes. The results are arranged in the following table.

TABLE V.—VOMITING REACTIONS IN DOGS

| Compound | Dose (mg./kg.) | Vomiting incidence [1] |
|---|---|---|
| L-cysteine | 200 | 4/4 |
| N-acetyl-L-cysteine | 269 | 1/6 |
| DL-penicillamine | 246 | 4/4 |
| N-acetyl-DL-penicillamine | 315 | 0/6 |

[1] Number of animals vomiting relative to (/) the number treated.

The innocuous character of N-acetyl-L-cysteine and N-acetyl-DL-penicillamine relative to the urinary excretion of copper, a biologically essential mineral element, was illustrated in an experiment employing rats treated with 1.65 millimoles per kg. of body weight of L-cysteine, DL-penicillamine, and their N-acetyl derivatives. Twenty-four hour urine samples were collected and copper was determined quantitatively by a standard analytical technique. The results are shown in the following table. Rats treated with DL-penicillamine showed a significantly increased excretion of copper, while excretion thereof with the other substances was normal.

TABLE VI.—URINARY EXCRETION OF COPPER BY RATS

| Compound | Copper excreted (mcg./kg.) |
|---|---|
| Saline control (0.9% sodium chloride) | [1] 110±39 |
| L-cysteine | 150±40 |
| N-acetyl-L-cysteine | 64±28 |
| DL-penicillamine | 196±17 |
| N-acetyl-DL-penicillamine | 133±50 |

[1] Standard error of the mean.

Powder blends of the following ingredients in the proportions shown are prepared and used to fill hard gelatin capsules of a size sufficient to accommodate the amounts of materials specified:

Mg.
(1) Sodium acetylsalicylic acid _____ 325
    N-acetyl-L-cysteine _____ 250
(2) Salicylamide _____ 325
    N-formyl-D-cysteine _____ 500
(3) Sodium salicylate _____ 300
    N-acetyl-DL-penicillamine _____ 250
(4) Sodium acetylsalicyclic acid _____ 325
    N-acetyl-β-mercapto-D-isoleucine _____ 500
(5) Sodium acetylsalicylic acid _____ 325
    N-caproylcysteine _____ 500

While several particular embodiments of this invention are shown above, it will be understood, of course, that the invention is not to be limited thereto, since many modifications may be made, and it is contemplated, therefore, by the appended claims, to cover any such modifications as fall within the spirit and scope of this invention.

What is claimed is:

1. The process of ameliorating an inflammatory condition in a mammal which comprises administering thereto an α-(N-acylamino)-β-mercaptoalkanoic acid or a salt thereof in anti-inflammatory, non-toxic amount by ingestion, injection, or rectal insertion, said acid having 3 to 11 carbon atoms apart from the N-acyl group thereof, wherein said N-acyl group is aroyl of up to 8 carbon atoms, alkanoyl, or alkandioyl of up to 6 carbon atoms.

2. The process of claim 1 wherein the daily dose of said α-(N-acylamino)-β-mercaptoalkanoic acid is from about 20 to 400 mg./kg. of body weight of said mammal.

3. The process of claim 1 wherein said mammal is concomitantly treated with an anti-inflammatory dose of a systemically acceptable salicylate analgesic.

4. The process of ameliorating an inflammatory condition in a mammal which comprises administering thereto N-acetylcysteine in anti-inflammatory, non-toxic amount by ingestion, injection, or rectal insertion.

5. The process of ameliorating an inflammatory condition in a mammal which comprises administering thereto N-acetylpenicillamine in anti-inflammatory, non-toxic amount by ingestion, injection, or rectal insertion.

6. The process of claim 4 wherein said mammal is concomitantly treated with an anti-inflammatory dose of a systemically acceptable salicylate analgesic.

7. The process of claim 5 wherein said mammal is concomitantly treated with an anti-inflammatory dose of a systemically acceptable salicylate analgesic.

8. The process of ameliorating an inflammatory condition in a mammal which comprises administering thereto N-succinylcysteine in anti-inflammatory, non-toxic amount by ingestion, injection, or rectal insertion.

9. The process of ameliorating an inflammatory condition in a mammal which comprises administering thereto N-benzoylcystein in anti-inflammatory, non-toxic amount by ingestion, injection, or rectal insertion.

10. The process of ameliorating an inflammatory condition in a mammal which comprises administering thereto N-propionylcysteine in anti-inflammatory, non-toxic amount by ingestion, injection, or rectal insertion.

11. A pharmaceutical composition in dosage unit form for administration by ingestion, injection, or rectal insertion comprising in anti-inflammatory effective amounts as active ingredients a systemically acceptable salicylate analgesic and an $\alpha$-(N-acylamino)-$\beta$-mercaptoalkanoic acid or a non-toxic salt thereof, said acid having 3 to 11 carbon atoms apart from the N-acyl group thereof, wherein said N-acyl group is aroyl of up to 8 carbon atoms, alkanoyl, or alkandioyl of up to 6 carbon atoms, the systemically acceptable salicylate analgesic being present in an amount from about 0.65 to 1.3 parts by weight of the $\alpha$-(N-acylamino)-$\beta$-mercaptoalkanoic acid or non-toxic salt thereof.

12. The composition of claim 1 wherein said salicylate analgesic is aspirin.

13. The composition of claim 11 wherein said salicylate analgesic is sodium acetylsalicylic acid.

14. The composition of claim 11 wherein said salicylate analgesic is salicylamide.

15. The composition of claim 11 wherein said salicylate analgesic is sodium salicylate.

16. The composition of claim 11 wherein said $\alpha$-(N-acylamino)-$\beta$-mercaptoalkanoic acid is N-acetylcysteine.

17. The composition of claim 11 wherein said $\alpha$-(N-acylamino)-$\beta$-mercaptoalkanoic acid is N-acetylpenicillamine.

18. The composition of claim 11 wherein each daily dosage unit thereof contains from about 0.15 to about 8 g. of said salicylate analgesic and from about 0.5 to about 10.0 g. of said $\alpha$-(N-acylamino)-$\beta$-mercaptoalkanoic acid or non-toxic salt thereof.

19. The composition of claim 11 wherein said $\alpha$-(N-acylamino) - $\beta$ - mercaptoalkanoic acid is N-succinylcysteine.

20. The composition of claim 11 wherein said $\alpha$-(N-acylamino)-$\beta$-mercaptoalkanoic acid is N-benzoylcysteine.

21. The composition of claim 11 wherein said $\alpha$-(N-acylamino) - $\beta$ - mercaptoalkanoic acid is N-propionylcysteine.

References Cited

UNITED STATES PATENTS 3,091,569   5/1963   Sheffner _____ 167—58

OTHER REFERENCES

Merck Index, 7th ed. (1960), pp. 12, 13, 916, 960 and 961.

STANLEY J. FRIEDMAN, Primary Examiner

U.S. Cl. X.R.

424—317, 319

UNITED STATES PATENT OFFICE
CERTIFICATE OF CORRECTION

Patent No. 3,591,686　　　　　　　　Dated July 6, 1971

Inventor(s) Aaron Leonard Sheffner

It is certified that error appears in the above-identified patent and that said Letters Patent are hereby corrected as shown below:

Column 4, line 11, in the footnote of the table, "60 to 30" should be -- 60 and 30 --

Column 5, line 13, delete "Methionine", second occurrence

Column 6, line 34, "N-acetyl-$\beta$-mercapto-D-isoleucine" should be -- N-acetyl-$\beta$-mercapto-DL-isoleucine --

Column 7, line 21, "claim 1" should be -- claim 11 --

Signed and sealed this 14th day of December 1971.

(SEAL)
Attest:

EDWARD M. FLETCHER, JR.　　　　ROBERT GOTTSCHALK
Attesting Officer　　　　　　　　Acting Commissioner of Patents